(12) United States Patent
Caruel

(10) Patent No.: US 8,584,363 B2
(45) Date of Patent: Nov. 19, 2013

(54) METHOD FOR MAKING AN ACOUSTIC PANEL FOR THE AIR INTAKE LIP OF A NACELLE

(75) Inventor: Pierre Caruel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 378 days.

(21) Appl. No.: 13/062,104

(22) PCT Filed: Aug. 14, 2009

(86) PCT No.: PCT/FR2009/001009
§ 371 (c)(1),
(2), (4) Date: Mar. 3, 2011

(87) PCT Pub. No.: WO2010/026305
PCT Pub. Date: Mar. 11, 2010

(65) Prior Publication Data
US 2011/0155855 A1    Jun. 30, 2011

(30) Foreign Application Priority Data

Sep. 3, 2008 (FR) .................................. 08/04823

(51) Int. Cl.
*B21D 53/92* (2006.01)
*B64C 23/00* (2006.01)
*B64D 15/12* (2006.01)
(52) U.S. Cl.
USPC ........ 29/897.2; 29/889.2; 244/1 N; 244/53 B; 244/134 D

(58) Field of Classification Search
USPC ........ 29/897.2, 889.2; 244/1 N, 53 B, 134 D, 244/134 R; 428/138, 324; 430/324
See application file for complete search history.

(56) References Cited

U.S. PATENT DOCUMENTS

| 4,780,382 A * | 10/1988 | Stengl et al. ..................... 430/5 |
| 6,054,690 A * | 4/2000 | Petit et al. ..................... 219/528 |
| 6,358,590 B1 * | 3/2002 | Blair et al. ..................... 428/73 |
| 6,457,676 B1 * | 10/2002 | Breer et al. ............... 244/134 R |
| 7,588,212 B2 * | 9/2009 | Moe et al. ................ 244/134 D |
| 7,780,117 B2 * | 8/2010 | Botura et al. ............. 244/134 D |
| 7,923,668 B2 * | 4/2011 | Layland et al. ............... 219/535 |
| 8,181,900 B2 * | 5/2012 | Chene et al. ................. 244/1 N |
| 2006/0204860 A1 * | 9/2006 | Pas ..................... 430/5 |
| 2008/0179448 A1 * | 7/2008 | Layland et al. ............... 244/1 N |
| 2010/0196660 A1 * | 8/2010 | Dressler ....................... 428/138 |

FOREIGN PATENT DOCUMENTS

EP   1826119 A2   8/2007
GB   885131       12/1961

OTHER PUBLICATIONS

International Search Report; PCT/FR2009/001009; Feb. 4, 2010.

* cited by examiner

*Primary Examiner* — Alexander P Taousakis
(74) *Attorney, Agent, or Firm* — Brinks Gilson & Lione

(57) ABSTRACT

The invention relates to a method for making an acoustic panel (12) for an air intake lip (2) of a nacelle (1) that includes the steps of obtaining a perforated de-icing assembly (14) including at least one array of conducting members obtained by a photolithographic method, said de-icing member (14) being secured to a structure with a cellular web (13). The invention also relates to an air intake lip and to a nacelle.

13 Claims, 4 Drawing Sheets

METHOD FOR MAKING AN ACOUSTIC PANEL FOR THE AIR INTAKE LIP OF A NACELLE

TECHNICAL FIELD

The invention relates to a method for making an acoustic panel with an air intake lip including a de-icing assembly.

The invention also relates to a nacelle for a turboshaft engine comprising such an air intake lip.

BACKGROUND

An airplane is propelled by one or several propulsive assemblies each comprising a turboshaft engine housed in a substantially tubular nacelle. Each propulsive assembly is attached to an aircraft by a mast situated under a wing or at the fuselage.

A nacelle generally has a structure comprising an air intake upstream of the engine and a middle section able to surround a fan of the turboshaft engine, a downstream section generally housing thrust reverser means and able to surround the combustion chamber of the turboshaft engine. The nacelle typically ends with an ejection nozzle, the outlet of which is situated downstream of the turboshaft engine.

The air intake comprises, on one hand, an intake lip adapted to allow optimal collection towards the turboshaft engine of the air necessary to supply the fan and the internal compressors of the turboshaft engine, and on the other hand, a downstream structure, on which the lip is attached, intended to suitably channel the air towards the blades of the fan. The assembly is attached upstream of a case of the fan belonging to the upstream section of the nacelle.

In flight, depending on the temperature and moisture conditions, ice can form on the nacelle in various places including the outer surface of the air intake lip. The presence of ice or frost modifies the aerodynamic properties of the air intake and disturbs the conveyance of the air towards the fan.

Moreover, aircraft turboshaft engines generate significant noise pollution. There is a high demand aiming to reduce this pollution, even more so given that the turboshaft engines used are becoming more and more powerful.

In order to further improve the acoustic performance of aircrafts, in particular turboshaft engine aircrafts, nacelles are provided with acoustic panels aiming to attenuate the noise generated by the turboshaft engine as well as the vibrations of the structures.

Acoustic panels are structures well known for absorbing noise. These panels usually include one or several layers of cellular core structures (commonly referred to as a "honeycomb" structures). These layers are coated on the lower face, i.e. not in contact with the flow of air inside the nacelle, with a so-called "non perforated or solid" skin impermeable to air, and on their upper face, i.e. in contact with the flow of air inside the nacelle, with a so-called "acoustic" perforated outer skin permeable to air.

One solution for de-icing or preventing the build-up of ice on the outer surface of the air intake lip consists of heating the walls of the air intake lip using an electric resistance.

The electric resistance is generally mounted on or in the outer wall of the air intake lip on the side with the cold air penetrating the nacelle.

In order to increase the treated acoustic surface of the air intake lip, it is possible to acoustically treat part of the lip.

However, it is necessary to make the acoustic treatment compatible with the de-icing method using an electric resistance, which is difficult to achieve.

BRIEF SUMMARY

One aim of the present invention is therefore to provide an air intake lip comprising an acoustic treatment and effective de-icing while also being simple to make.

To that end, according to a first aspect, the invention relates to a method for making an acoustic panel of an air intake lip of a nacelle comprising the following steps:

A. producing an outer skin reproducing the aerodynamic line of the air intake lip;

B. fastening a conductive layer on said outer skin, said conductive layer including conducting members;

C. fastening a photosensitive layer on said conductive layer, said photosensitive layer comprising at least one photosensitive member;

D. piercing the material thus formed using a piercing means to form acoustic holes;

E. applying a mask on the photosensitive layer of material at the end of step D so as to form an array of conducting members not obstructing the holes resulting from step D;

F. revealing said array using a photolithography method;

G. electrically isolating the surface of the array resulting from step F;

H. fastening a cellular core structure on the de-icing assembly obtained at the end of step G;

I. applying a second skin on the de-icing assembly thus obtained at the end of step H, thereby forming an acoustic panel.

The method according to the invention advantageously makes it possible to simply and efficiently produce an acoustic panel of an air intake lip. The method according to the invention has a number of steps limiting manual operations.

The method according to the invention advantageously makes it possible to position the conducting members precisely relative to the acoustic holes. Thus, the obstruction of such holes is advantageously prevented, which increases the acoustic performance of the acoustic panel. Moreover, piercing of the heating conducting members is advantageously avoided, which ensures effective de-icing of the air intake lip.

According to other features of the invention, the method according to the invention includes one or several of the following optional features, considered alone or according to all possible combinations:

- the electric insulation is done by depositing an oxide layer, which makes it possible to obtain a selective deposition on the conducting members without obstructing the acoustic holes,
- in step H, the de-icing assembly obtained at the end of step G is fastened on the cellular core structure by adhesion,
- the cellular core structure is a honeycomb structure,
- the glue is applied on the array of conducting members by blowing compressed air in through the acoustic holes, which makes it possible to prevent the acoustic holes from being obstructed by the glue,
- the conducting members are chosen among copper, aluminum, or an alloy of copper and nickel, which makes it possible to have a resistant circuit and therefore to obtain good de-icing,
- the mask is a xylene-based films,
- the conductive layer is applied on a flexible substrate capable of substantially fitting the shape of the outer skin, at least locally, which allows the substrate to be applied on the outer skin while limiting the number of cutouts, the substrate comprises glass fibers, which makes it possible to improve the flexibility of the conductive layer on the outer skin and to electrically isolate the conducting members and the outer layer, before step E, a plurality of centering means is applied on the material resulting from step D to position the mask durably and precisely, the diameter of the acoustic holes made in step D is between 0.2 mm and 0.5 mm, which makes it possible to obtain an optimal acoustic surface, a metal web is applied on the outer skin, which makes it possible to reduce the aerodynamic losses caused by the presence of acoustic holes and to increase the diameter of the acoustic holes, between 1.5 mm and 2 mm.

According to a second aspect, the invention relates to an air intake lip comprising a panel capable of being obtained using the method according to the invention, comprising an outer skin on which a perforated de-icing assembly is attached comprising at least one array of conducting members obtained using a photolithography method, said de-icing member being fastened on a cellular core structure.

According to another aspect, the invention relates to a turboshaft engine nacelle including an air intake lip according to the invention.

BRIEF DESCRIPTION OF THE DRAWINGS

The invention will be better understood upon reading the following non-limiting description, done in reference to the appended figures.

DETAILED DESCRIPTION

Figure 1:
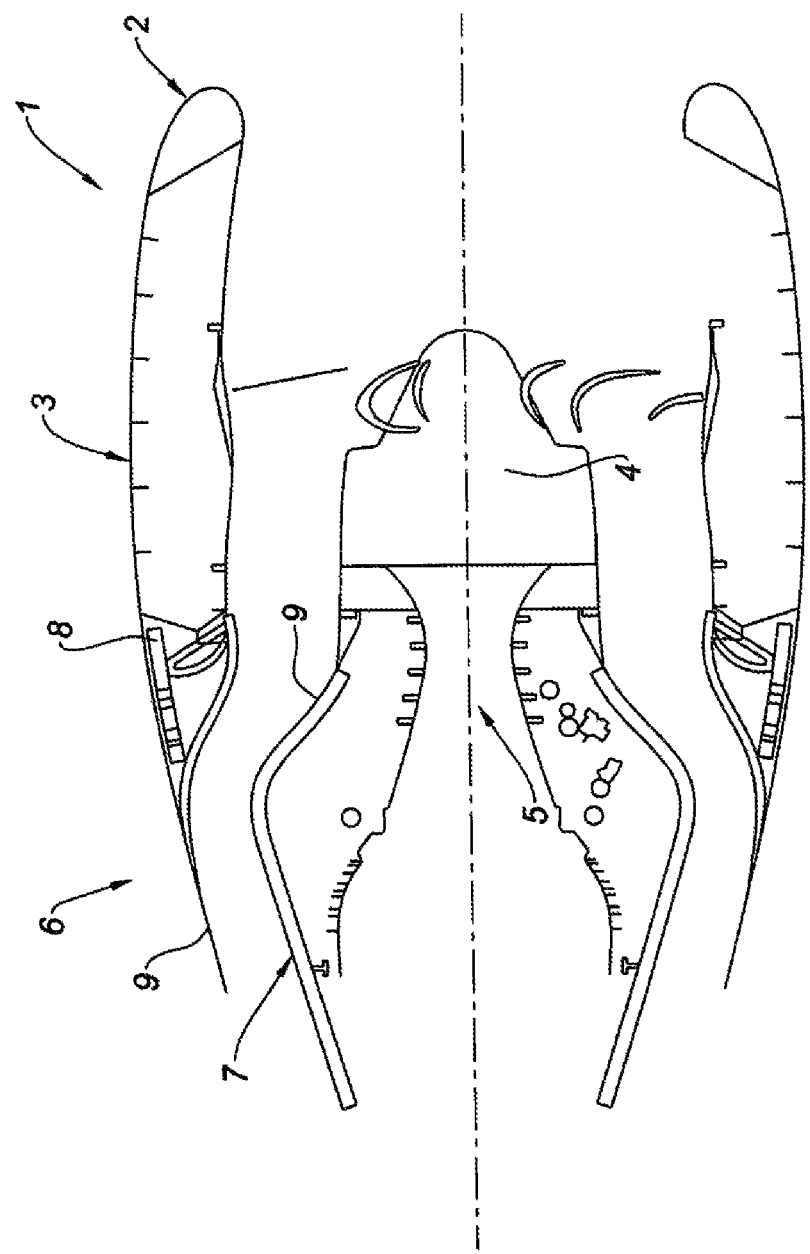
FIG. 1 is a transverse diagrammatic cross-section of a nacelle according to the invention surrounding a turboshaft engine.

As shown in FIG. 1 for a turbojet engine, a nacelle 1 according to the invention comprises an air intake lip 2, a middle structure 3 surrounding a fan 4 of the turboshaft engine 5 and a downstream assembly 6. The downstream assembly 6 is formed by an inner fixed structure 7 (IFS) surrounding the upstream portion of the turboshaft engine 5, an outer fixed structure 8 (OFS), and a mobile cowling 9 comprising a thrust reverser means.

Figure 2:
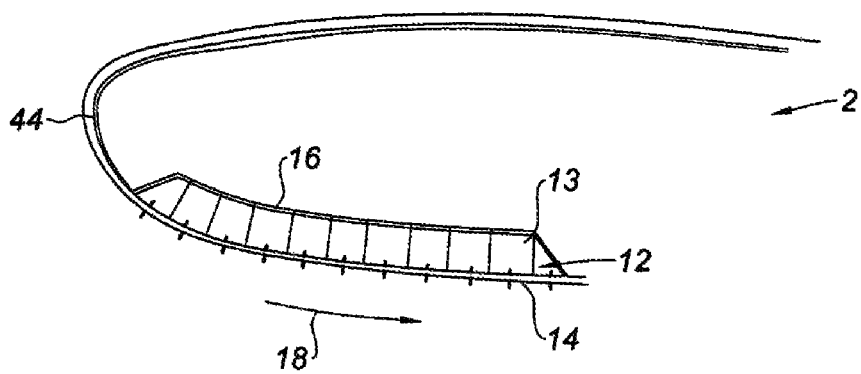
FIG. 2 is a diagrammatic transverse cross-section of an air intake lip according to the invention.

As shown in FIG. 2, the air intake lip 2 according to the invention comprises, in certain zones, an acoustic panel 12 in order to absorb the sound pollution due to the operation of the turboshaft engine 5. The acoustic panel 12 includes a honeycomb structure 13 on which a perforated de-icing assembly 14 is attached and a solid inner skin 16. The de-icing assembly 14 is in contact with the cold air flow 18, which is not the case with the inner skin 16.

The acoustic panel 12 is obtained using the method according to the invention comprising the following steps:

A. producing an outer skin reproducing the aerodynamic line of the air intake lip;
B. fastening a conductive layer on said outer skin, said conductive layer including conducting members;
C. fastening a photosensitive layer on said conductive layer, said photosensitive layer comprising at least one photosensitive member;
D. piercing the material thus formed using a piercing means to form acoustic holes;
E. applying a mask on the photosensitive layer of material at the end of step D so as to form an array of conducting members not obstructing the holes resulting from step D;
F. revealing said array using a photolithography method;
G. electrically isolating the surface of the array resulting from step F;
H. fastening a cellular core structure on the de-icing assembly obtained at the end of step G;
I. applying a second skin on the de-icing assembly thus obtained at the end of step H, thereby forming an acoustic panel.

The method according to the invention advantageously makes it possible to more simply and efficiently produce an acoustic panel that can be electrically de-iced while limiting the number of manual operations. Indeed, the piercing of acoustic holes in the de-icing assembly is done before the array of conducting members is formed. Thus, the method according to the invention advantageously makes it possible to save time in manufacturing acoustic panels. It also makes it possible to prevent the acoustic holes from being obstructed by the array of conducting members or from piercing the latter.

The method according to the invention also makes it possible to obtain any geometry of conducting members known by those skilled in the art, in particular combinations of conducting members arranged in series and in parallel, enabling a tolerance to damage by some of the conducting parts of the array. The geometry can therefore be determined as a function of the distribution of the acoustic holes such that the array is as efficient as possible while optimizing the acoustic performance of the acoustic panel. Typically, the method according to the invention makes it possible to obtain spacing between the branches of the array and spacing with the acoustic holes in the vicinity of 0.3 mm.

Figure 3:
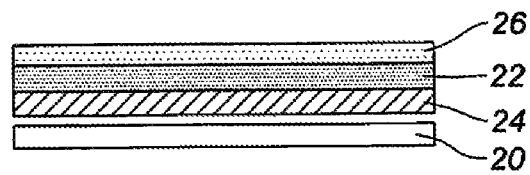
FIGS. 3 to 8, 10 and 11 are diagrammatic transverse cross-sections of the acoustic panel at different steps of the method according to the invention.

In step A of the method according to the invention, an outer skin 20 is produced reproducing the aerodynamic line of the air intake lip 2 (see FIG. 3). Such an embodiment can be carried out using any means known by those skilled in the art.

Advantageously, the method according to the invention makes it possible to obtain an acoustic panel 12 in which the de-icing assembly 14 substantially follows the profile of the air intake lip 2.

The outer skin 20 can be made by forming a sheet, for example aluminum or titanium. According to one alternative, the outer skin 20 can be obtained by drape molding of webs of fabrics or unidirectional carbon and/or glass fibers or any composite material suitable for carrying out the invention using any method known by those skilled in the art.

The outer skin 20 can also be coated with a protective element, for example of the paint or bronze mesh type.

As shown in FIG. 3, in step B of the method according to the invention, a conductive layer 22 is fastened on said outer skin 20, said conductive layer 22 comprising conducting members.

The conductive layer 22 is arranged on the face of the outer skin 20 so as to be in contact with the cellular core structure 13. The other face of the outer skin 20 is intended to be in contact with the flow of cold air 18. The conductive layer 22 can also be associated with a glass fiber substrate, obtained from planar plates, and cut so as to be able to be applied locally on the air intake lip 2, despite having a non-developable shape.

The conducting members are preferably chosen among copper, aluminum, and/or an alloy of copper and nickel. Such conducting members advantageously make it possible to release heat through the passage of electric current. To that end, the conductive layer 22 is connected to a source of current using any means known by those skilled in the art. The electrical connection of the conductive layer 22 can be done outside the acoustic panel 12 by extending the conductive layer 22 to the desired location. The power cables may for example be welded directly on the conductive layer 22 or connected to terminals.

The conductive layer 22 is put directly on the outer skin 20 or applied, beforehand, on a planar and flexible substrate 24. The flexible support 24 may be made up of glass fibers, in particular glass fiber fabrics whereof the number of webs is between 1 and 3.

Preferably, the substrate 24 is flexible and can substantially fit the shape of the outer skin 20 at least locally, or over the entire surface. Such a substrate 24 advantageously makes it possible to limit the number of cuts to be made in the material formed by the conductive layer 22 and the substrate 24 in order to fit the shape of the outer skin 20. Thus, the number of steps in manufacturing the de-icing assembly is advantageously limited. Indeed, since the air intake lip 2 has a non-developable shape and in the case where the conductive layer 22 is made from planar plates, it is necessary to cut the substrate 24 like a comb, so as to be able to curve the assembly to fit the shape of the outer skin 20.

The substrate 24 is fastened to the conductive layer 22 using any means known by those skilled in the art, in particular by adhesion.

In step C of the method according to the invention, a photosensitive layer 26 is fastened on said conductive layer 22, said photosensitive layer 26 comprising at least one photosensitive member, in particular photosensitive resin. The photosensitive layer 26 can also be present in the case of realization from a substrate obtained from planar plates.

Figure 4:
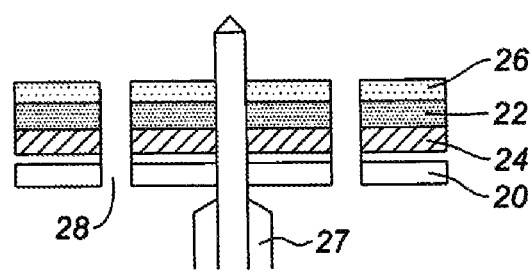

As shown in FIG. 4, in step D of the method according to the invention, the material thus formed is pierced using a piercing means 27 in order to form acoustic holes 28.

The piercing means 27 is any suitable means known by those skilled in the art to form acoustic holes 28. The acoustic holes 28 typically have a diameter between 0.1 mm and 0.8 mm, preferably between 0.2 mm and 0.5 mm. Such a diameter of acoustic holes 28 makes it possible to obtain an optimal acoustic surface for the acoustic panel 12.

Examples of piercing means 27 comprise a multi-pin mechanical drilling machine, a laser, or a water jet. The piercing of the material resulting from steps A, B and C can be done through the inside or outside of the material, i.e. through the face of the photosensitive layer 26 or through the face of the outer skin 20.

Figure 5:
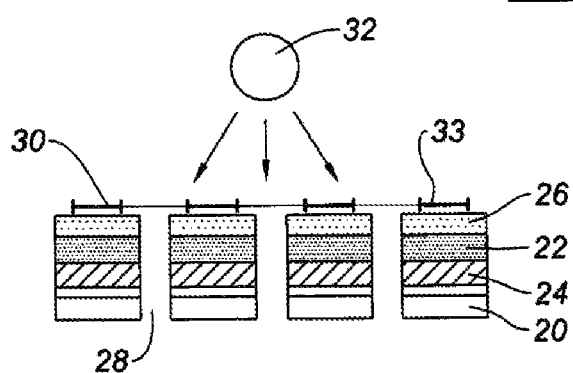

As shown in FIG. 5, in step E of the method according to the invention, a mask 30 is applied on the photosensitive layer 26 of the material resulting from step D so as to form an array of conducting members not obstructing the holes 28 resulting from step D.

As an example, the mask 30 can be chosen from any suitable transparent material known by those skilled in the art. Preferably, the mask 30 is a xylene-based film, for example Mylar®.

According to one preferred alternative, before step E of the method according to the invention, a plurality of centering means (not shown) is applied on the material resulting from step D to position the mask 30 durably and precisely. Thus, the pattern of the array of conducting members is made precisely so as to prevent the conducting members from interfering with the holes 28.

It is possible to adjusting the portion of the mask 30 manually to perfect the position of the array of conducting members relative to the holes 28.

The placement of the mask 30 can be facilitated, for example, by piercing, by hand, for each mask 30 applied on the material resulting from step D, one or several reference holes (not shown), thereby making it possible to position one or several centering means. The reference hole(s) can coincide with an acoustic hole 32.

The centering means can then be removed when it is no longer necessary. The reference hole is then obstructed using any suitable means known by those skilled in the art, in order to preserve the acoustic surface. It is also possible not to obstruct the reference holes.

In step F of the method according to the invention, the array of conducting members is revealed using a photolithography method.

The material resulting from step E is then insulated, using any suitable means 32 known by those skilled in the art. Examples include ultraviolet light sources.

The photosensitive layer 26 protected by the pattern 33 drawn on the mask 30 is not obscured by the UV radiation, which makes it possible to print the pattern on said layer 26. The unprotected photosensitive layer 26 is obscured.

The insulation typically lasts several minutes. Indeed, the exposure time of the photosensitive layer 26 must be long enough for the pattern 33 to be printed on said photosensitive layer 26, but short enough to prevent the UV rays from passing through the entire area of the mask 30, thereby erasing any pattern.

The unprotected photosensitive layer 26 is then eliminated using any suitable revealing product known by those skilled in the art. Examples include caustic soda.

Figure 6:
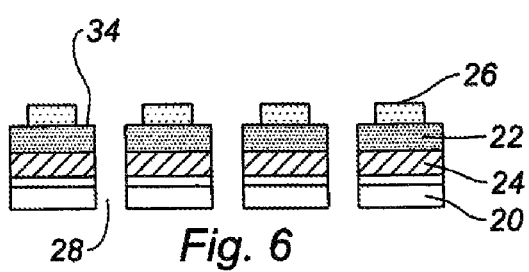

Because of this, as shown in FIG. 6, the remaining photosensitive layer 26 reproduces the pattern of the desired array.

Figure 7:
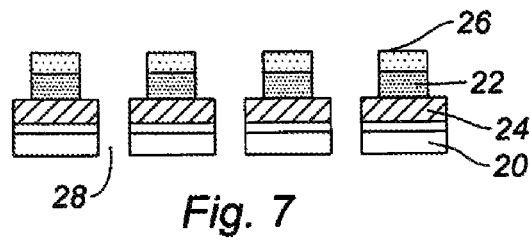

Any suitable chemical product known by those skilled in the art is then applied in order to eliminate the portion 34 of the conductive layer not situated below the remaining photosensitive layer 26. Thus, as shown in FIG. 7, only the portion of the conductive layer 22 remains that is situated below the pattern formed by the photosensitive layer 26.

Figure 8:
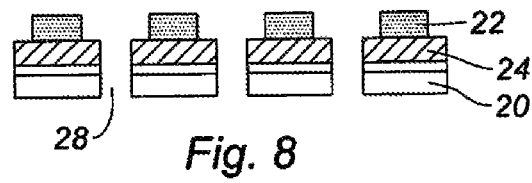
Figure 9:
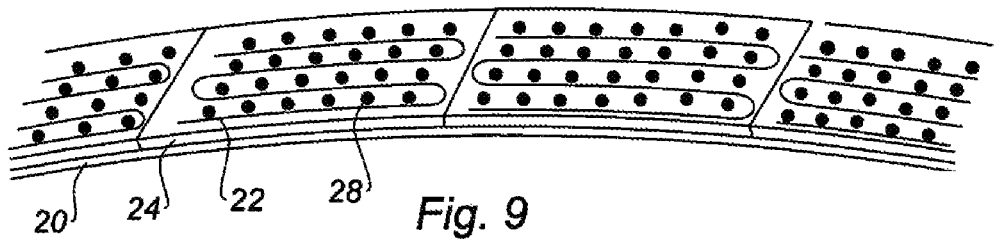
FIG. 9 is a perspective view of the embodiment of FIG. 8.

The remaining photosensitive layer 26 is then eliminated using any suitable chemical product known by those skilled in the art such that the conductive layer 22 reveals the pattern of the array of conducting members (see FIGS. 8 and 9).

Figure 10:
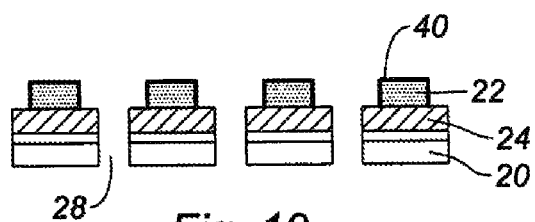

In step G of the method according to the invention, the surface of the array resulting from step F is electrically isolated (see FIG. 10). The electric isolation generally makes it possible to thermally isolate the array resulting from step F.

The conducting members of the conductive layer 22 are generally sensitive to oxidation. Because of this, they must be protected.

Preferably, the electric isolation is done by precisely depositing an oxide layer, which makes it possible to obtain a selective deposition on the array and therefore on the conducting members without obstructing the acoustic holes 28. As an example, the deposition can be done by electrolysis when the array is made from aluminum. The layer of aluminum can be deposited by anodizing.

The thickness of the oxide layer is between 1 μm and 0.05 mm, in particular 0.01 mm.

As an example, the oxide used can be aluminum oxide if the conducting members are made from aluminum, which makes it possible to obtain optimal isolation.

The protection can also be achieved by depositing any protective material such as a varnish, by initially and selectively protecting the reference and acoustic holes by applying a layer of photosensitive elements, using the same photolithography method as previously described. The method thus described makes it possible to protect all of the conducting members without obstructing the reference and acoustic holes.

Figure 11:
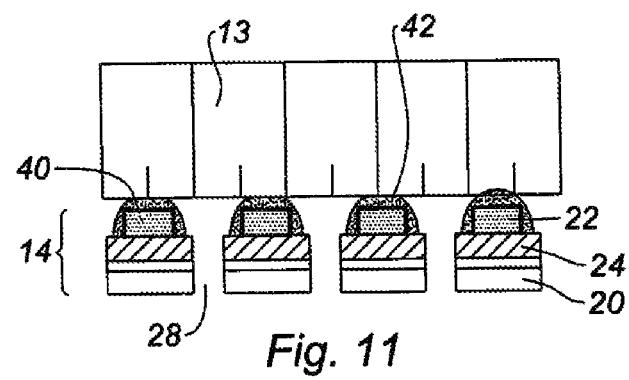

As shown in FIG. 11, in step H of the method according to the invention, a cellular core structure 13 is fastened on the de-icing assembly 14 obtained at the end of step G. Preferably, the cellular core structure 13 is a honeycomb structure.

The fastening can be done using any means known by those skilled in the art, but preferably by adhesion.

According to a first embodiment, a film of glue is applied on the edges of the honeycomb so as to adhere the honeycomb structure 13 and the de-icing assembly 14 resulting from step G, and also to improve the electric and thermal insulation of the conducting members.

According to one preferred embodiment shown in FIG. 11, the glue 42 is applied on the array of conducting members by blowing compressed air in through the acoustic holes 28 in the case where they have a sufficient diameter to allow a sufficient flow of blown air. Thus, one advantageously avoids obstructing the acoustic holes 28 with glue 42. Examples include an epoxy-based glue of the Redux 322® type.

In step I of the method according to the invention, a second skin 16 is applied on the de-icing assembly thus obtained at the end of step H, thereby forming the acoustic panel 12.

Figure 12:
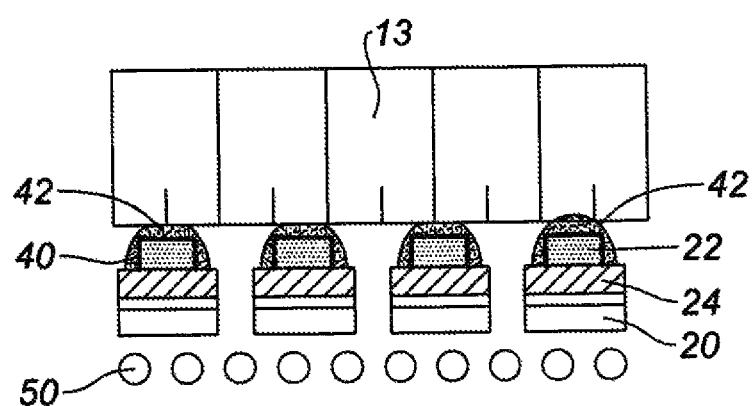
FIG. 12 is a diagrammatic transverse cross-section of the acoustic panel obtained according to an alternative of the method according to the invention.

According to one preferred embodiment shown in FIG. 12, a metal mesh 50 is applied, in particular by adhesion, on the outer skin 20. The mesh 50 is intended to reduce the aerodynamic losses by interaction of the outside flow with the inside of the acoustic holes 28. Advantageously, it is possible to pierce acoustic holes 28 with a diameter between 1.3 mm and 2.2 mm, preferably between 1.5 mm and 2 mm without creating aerodynamic penalties. The metal mesh 50 also has the advantage of protecting the air intake lip 2 against lightning impact.

In the portion 44 of the non-acoustic treated air intake lip not comprising a honeycomb structure 13, a simple insulating and protective material can optionally be attached using any means known by those skilled in the art on the de-icing assembly 14 (see FIG. 2). As an example, it is possible to use a composite skin as the material to have good structural resistance.

It is possible to anneal the acoustic panel 12 resulting from step I at a temperature, typically between 170° C. and 180° C., or equal to about 175° C. in order to secure the acoustic panel 12.

The invention claimed is:

1. A method for making an acoustic panel of an air intake lip of a nacelle comprising:
   A. producing an outer skin reproducing an aerodynamic line of the air intake lip;
   B. fastening a conductive layer on said outer skin, said conductive layer including conducting members;
   C. fastening a photosensitive layer on said conductive layer, said photosensitive layer including at least one photosensitive member;
   D. piercing the material thus formed using a piercing means to form acoustic holes;
   E. applying a mask on the photosensitive layer of material at the end of step D so as to form an array of conducting members not obstructing the holes resulting from step D;
   F. revealing said array using a photolithography method;
   G. electrically isolating the surface of the array resulting from step F;
   H. fastening a cellular core structure on the de-icing assembly obtained at the end of step G;
   I. applying a second skin on the de-icing assembly thus obtained at the end of step H, thereby forming an acoustic panel.

2. The method according to claim 1, wherein in step G, the electric isolation is done by depositing an oxide layer.

3. The method according to claim 1, wherein in step H, the de-icing assembly obtained at the end of step G is fastened on the cellular core structure by adhesion.

4. The method according to claim 1, wherein the cellular core structure is a honeycomb structure.

5. The method according to claim 1, wherein the glue is applied on the array of conducting members by blowing compressed air in through the acoustic holes.

6. The method according to claim 1, wherein the conducting members comprise at least one of copper, aluminum, or an alloy of copper and nickel.

7. The method according to claim 1, wherein the mask is a xylene-based films.

8. The method according to claim 1, wherein the conductive layer is applied on a flexible substrate capable of substantially fitting the shape of the outer skin at least locally.

9. The method according to claim 8, wherein the substrate includes glass fibers.

10. The method according to claim 1, wherein before step E, a plurality of centering means is applied on the material resulting from step D to position the mask durably and precisely.

11. The method according to claim 1, wherein a diameter of the acoustic holes made in step D is between 0.2 mm and 0.5 mm.

12. The method according to claim 1, wherein a metal web is applied on the outer skin.

13. The method according to claim 1, wherein a diameter of the acoustic holes made in step D is between 1.5 mm and 2 mm.

* * * * *